No. 780,842. PATENTED JAN. 24, 1905.
F. K. VREELAND.
METHOD OF RECEIVING ELECTROMAGNETIC WAVES OR OTHER
FEEBLE SIGNAL IMPULSES.
APPLICATION FILED AUG. 1, 1904.
2 SHEETS—SHEET 1.
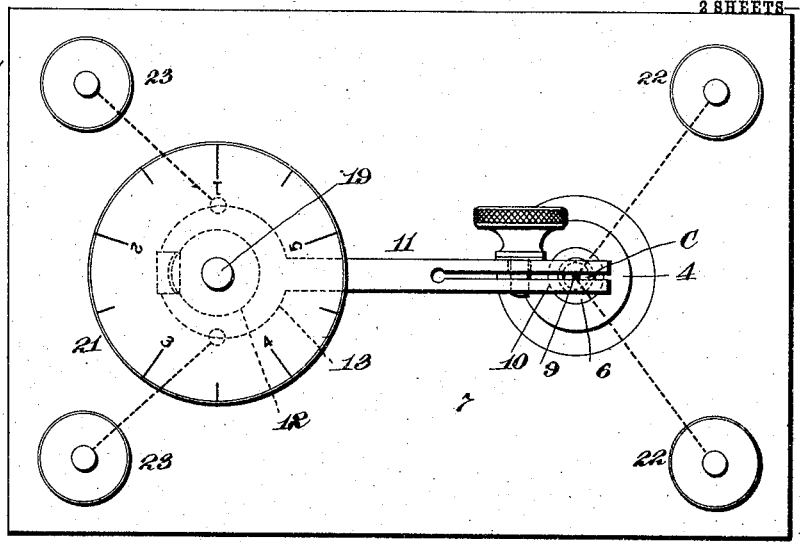
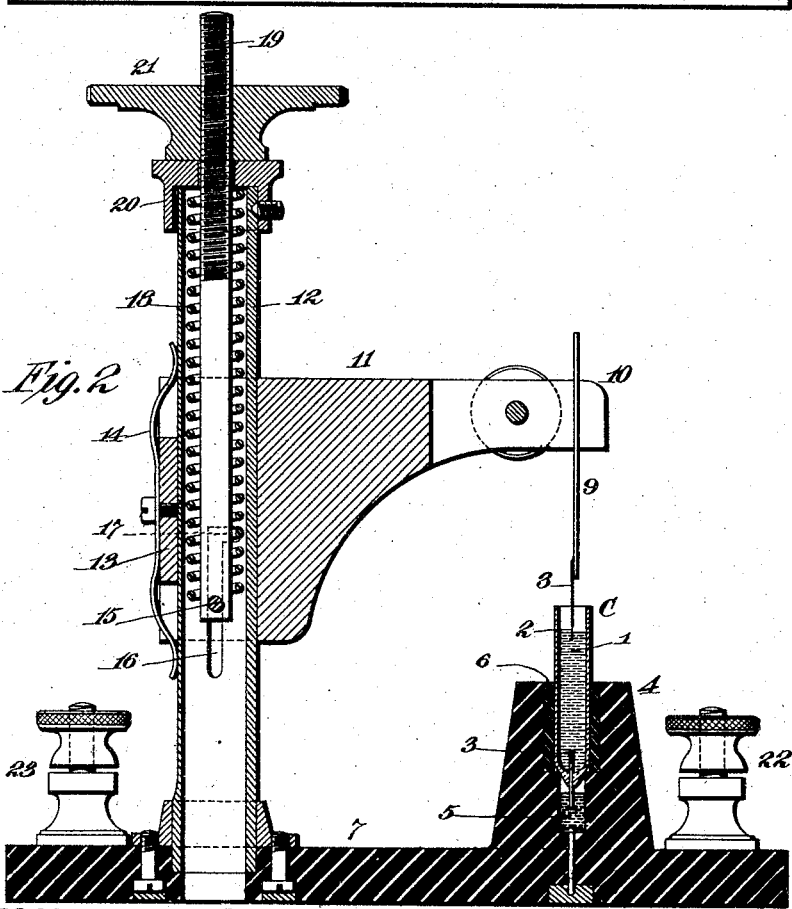
Witnesses:
Jas. F. Coleman
Jno. Robt Taylor
Inventor
Frederick K. Vreeland
By Dyer & Dyer
Attorneys.

No. 780,842. PATENTED JAN. 24, 1905.
F. K. VREELAND.
METHOD OF RECEIVING ELECTROMAGNETIC WAVES OR OTHER
FEEBLE SIGNAL IMPULSES.
APPLICATION FILED AUG. 1, 1904.
2 SHEETS—SHEET 2.
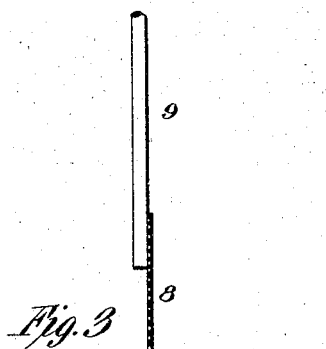
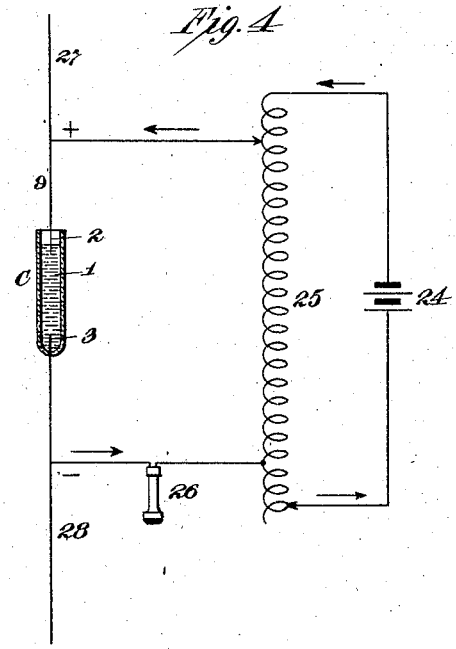
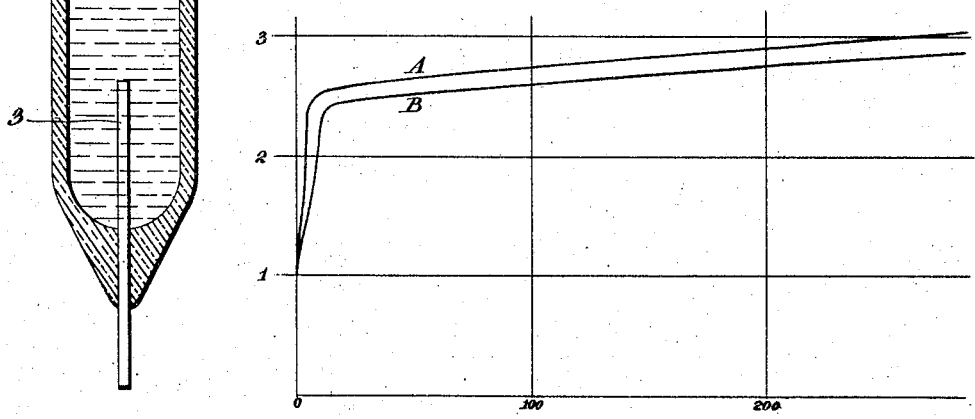
Witnesses:
Jas. F. Coleman
Jno. Robt Taylor
Inventor
Frederick K. Vreeland
By Dyer & Dyer
Attorneys.

No. 780,842.                                              Patented January 24, 1905.

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y., A CORPORATION OF NEW YORK.

METHOD OF RECEIVING ELECTROMAGNETIC WAVES OR OTHER FEEBLE SIGNAL IMPULSES.

SPECIFICATION forming part of Letters Patent No. 780,842, dated January 24, 1905.

Application filed August 1, 1904. Serial No. 219,016.

*To all whom it may concern:*

Be it known that I, FREDERICK K. VREELAND, a citizen of the United States, residing at Montclair, in the county of Essex and State of New Jersey, have invented a certain new and useful Method of Receiving Electromagnetic Waves or other Feeble Signal Impulses, of which the following is a description.

The object I have in view is the production of a method for the detection of electromagnetic waves or other feeble electrical signal impulses.

The invention has been found especially useful for the reception of signals in wireless telegraphy.

My invention depends upon the discovery made by me that an electrolytic cell of a special character when polarized to the proper critical point by a local battery is extremely sensitive to transitory or rapidly-oscillating currents from another source which when passed through it tend to depolarize the cell and cause it to offer less opposition to the passage of the local current, which rises and falls in value with the presence and absence of the transitory waves or impluses and affords an effective means for operating a telephone or other signal receiver. The polarized cell is one of special character, particularly in the respect that the anode of the cell (*i. e.*, the electrode connected with the positive pole of the local battery) presents to the electrolyte a minute surface, producing a cell of minute electrolytic capacity. This I have found enables the cell to be depolarized sufficiently by electromagnetic waves or other feeble signal impulses to cause variations of the local current therethrough great enough to effectively operate a telephone or other signal receiver. The anode of the cell may be made of any suitable metal or other conducting material which is not changed by the electrolyte or attacked by the gaseous ions which are produced thereon. It may consist of a minute platinum wire having a diameter approximately .0001 inch and immersed in the electrolyte a few thousandths of an inch. If this immersion is .005 of an inch, as it may properly be, the surface presented to the electrolyte is approximately .001 square millimeter. The size of this minute surface may be varied considerably in the region of this value. To obtain the best results, the area of contact-surface between the anode and the electrolyte should be properly proportioned to the intensity of the impulses to be detected. In general the apparatus becomes more sensitive to feeble impulses as the size of the anode is diminished; but when stronger impulses are received an increased effect may be obtained in the receiving instrument by increasing the area of the anode. For a given strength of impulse there is usually a certain size of anode which gives the maximum effect. If the anode be made larger than this, the apparatus becomes less sensitive. If it be made smaller, the strength of the impulse is more than sufficient to effect the depolarization of the cell and the remaining energy is wasted. In practice, however, an anode small enough to be sensitive to the most feeble impulses to be received will usually work well with any stronger impulse. I have found that a platinum wire of .0001 inch in diameter immersed in the electrolyte a few thousandths of an inch will meet this practical condition. This minute wire may be produced by drawing down a large silver wire with a platinum core, after which the end of the platinum core is exposed by dissolving the silver in nitric acid. As the useful action of polarization occurs at the anode, the size of the cathode is of little importance, though it should be preferably much larger than the anode. I use ordinarily a cathode of platinum wire .01 inch in diameter sealed into the bottom of a small glass vessel and projecting into the electrolyte one-quarter of an inch. If the cathode be made as small as the anode, the device will still operate, but less efficiently owing to the increased resistance of the cell. The distance between the anode and the cathode is also immaterial except as it affects the resistance of the cell. Ordinarily I prefer to place them about one-half inch apart, though this distance may be decreased to a few thousandths of an inch or increased to several inches without greatly affecting the result.

A suitable construction of cell is a vessel consisting of a glass tube having a bore a quarter of an inch in diameter and having a length of about an inch, one end of the tube being closed to form the bottom of the vessel and the cathode being sealed by the fusion of the glass into this closed end of the tube. The anode may be supported by a piece of silver wire a half-inch in length and having the minute platinum core projecting from one end. The silver wire may be attached to a larger copper wire, which will be held by a vertically-adjustable clamp, the anode projecting into the open upper end of the glass cell, which will be supported by a suitable socket. The electrolyte is preferably one with which the products of electrolysis are gaseous, particularly those generated at the anode. I prefer to use a solution which is decomposed into oxygen at the anode and hydrogen at the cathode. This is true of a large variety of substances, including the ordinary oxygen acids and alkali bases and their compounds; but many of these are not practically suitable on account of the disposition of solid matter upon the anode. Among the solutions that I have found suitable are sulfuric acid, nitric acid, sodium carbonate, potassium hydrate, potassium nitrate, and mercuric nitrate. All of these have the property of evolving oxygen gas at the anode when the latter is of platinum or other insoluble material. It is not necessary that the cathode deposit should be gaseous, because the polarization electromotive force at the cathode is usually small even when hydrogen is evolved, whereas the polarization electromotive force due to the oxygen at the anode is much larger, and hence is relied upon to produce the useful effect of the apparatus. Where the anode is in the form of a minute platinum wire supported by a jacket of other material, such as silver, it is desirable that the liquid electrolyte be a substance which will dissolve the jacket electrolytically, but will not attack it chemically. This makes it possible to renew the point when broken or otherwise injured by simply adjusting the covered wire down into the solution. The covering will be stripped off of the fine platinum core by electrolysis produced by the local battery until the covering is free from contact with the electrolyte. The covering, however, is not dissolved chemically by the liquids, which creep up the wire so as to leave the fine platinum point unsupported. With a silver-covered platinum wire dilute nitric acid and solutions of the nitrates of various metals may be employed. I prefer to use with the silver-covered wire a twenty-per-cent. solution of nitric acid. If the percentage of acid is greatly increased beyond this point, the silver is attacked chemically by the solution which creeps up the wire, leaving the platinum point unsupported, and if the solution is greatly diminished in strength the operation of the apparatus is impaired by the formation of crystals upon the anode. When such a cell is connected across a source of suitable electromotive force, such as a primary or secondary battery, with the positive pole of the battery connected to the minute anode, the cell becomes polarized and exerts a counter electromotive force which opposes the flow of the current from the battery. This counter electromotive force is due mainly to the presence of the gas, such as oxygen, evolved at the anode. The relation between the current and impressed electromotive force with a cell of this character and having an electrolyte consisting of a twenty-per-cent. nitric-acid solution is illustrated in Fig. 5. The ordinates represent a varying electromotive force applied to the cell by the local battery expressed in volts, while the abscissas represent the current flowing through the cell expressed in millionths of an ampere. The upper curve A shows the relation between the current and impressed electromotive force of the cell in its normal condition, the polarization being due entirely to the current from the local battery. The lower curve B represents the same relation when the cell is traversed by oscillating currents such as are used in wireless telegraphy. Theoretically the decomposition voltage is about 1.7 volts when the products of electrolysis are oxygen and hydrogen; but actually, as appears from the curve A, it is found that a small current may flow even at impressed voltages as low as one or 1.1 volts. This current, which is very minute, is probably due to diffusion of the gases through the liquid and not to true conduction. On the other hand, it is found that the polarization voltage increases with the strength of the polarizing-current. Thus, as appears from curve A, the current increases gradually with increasing impressed voltage up to about 2.4 volts, at which point the polarization voltage approaches a maximum, and on the upper part of the curve the increase of current is governed practically by the ohmic resistance of the cell. Throughout this upper flat part of the curve there is a violent evolution of gas-bubbles in the cell, which impairs the effectiveness of the apparatus. A certain constant current appears to be necessary to maintain the polarization at a stated value, which balances the impressed electromotive force. A slight sudden increase in the impressed electromotive force results in a large rush of current, which, however, diminishes rapidly as the polarization readjusts itself to the increased electromotive force. A similar effect is produced when electrical oscillations or other transitory currents are passed through the cell. These have the effect of completely or partially depolarizing the cell, and a corresponding increase of the local current results. The curve B in Fig. 5 illustrates this. At two volts, for instance, the local current increases under the influence of the oscillations from .000003 to .000009 of an ampere. These are the steady values of the current. The momentary increase while the cell is readjusting itself to the changed conditions is very much greater and being of a sudden and transitory character has a much larger effect upon a telephone connected in the circuit than would be indicated by the values derived from the curve. For these reasons the apparatus is most sensitive when used with a telephone for receiving audible signals; but the constant increase of current indicated by the curve may also be utilized to operate a siphon-recorder or other recording apparatus. The terminal voltage of the cell produced by the local battery at which the cell is most sensitive to electromagnetic waves or other feeble impulses varies with different electrolytes and with different strengths of the solution. The cell is sensitive to oscillations over a considerable range of electromotive force; but it works most efficiently at a point a little below the bend of the curve, where a decided evolution of gas begins to occur. At this point the cell is less stable than at other voltages, and any stimulus gives a greater change in the state of polarization, and hence in the local current. This best voltage is about 1.8 volts for strong nitric acid, is higher for dilute acid, and may reach four or five volts or more in dilute alkali solutions. Where the feeble impulses to be detected are unidirectional, care should be taken that they are passed through the cell in a direction opposite to the flow of the current from the local battery. These impulses will then have the effect of momentarily diminishing or even entirely annulling the existing polarization, resulting in the flow of a largely-increased current from the local battery through the depolarized cell. The apparatus is thus useful for detecting the feeble and transitory currents employed in cable telegraphy or for similar uses. If the polarity of the local battery is reversed—i. e., its negative pole is connected to the electrode of minute surface—the apparatus becomes inoperative for the detection of electromagnetic waves or other feeble signal impulses. In this case the large terminal becomes the anode and the currents to be detected are too feeble to effect any appreciable change of polarization over its large surface. The apparatus will work with a voltage of the local battery considerably below the decomposition voltage of the cell, especially when the impulses to be detected are strong; but under these conditions the apparatus is less sensitive. I prefer, however, to produce by the local battery a difference of potential at the terminals of the cell somewhat higher than the decomposition voltage of the cell, but below the point where violent evolution of gas is caused.

My detector of electromagnetic waves, the method of operation of which and whose principal constructional features have already been described, possesses numerous advantages over apparatus heretofore employed for the same purpose. It is extremely sensitive and responds to the most rapid impulses, being practically instantaneous in action. It is reliable and permanent in adjustment, does not require delicate handling or adjustment in operation, is not injured by lightning discharges or by the transmitting apparatus, lends itself readily to tuning—i. e., selective signaling—is capable of being used either for the production of audible signals by a telephone or for the recording of signals, and, finally, it is characterized by extreme simplicity of construction.

In the drawings, Figure 1 is a top view of the cell-support and its constructional adjuncts. Fig. 2 is a vertical section of the apparatus of Fig. 1, the size of the minute anode being necessarily exaggerated. Fig. 3 is an enlarged view of the cell. Fig. 4 is a diagram illustrating the connections of the cell for receiving electromagnetic waves, and Fig. 5 represents curves illustrating the action of the cell.

The cell C is a small glass vessel containing the electrolyte 1, into which dips the minute anode 2. The cathode 3 of larger area is sealed into the glass bottom of the vessel C, projecting inwardly into the electrolyte and outwardly beyond the bottom of the vessel. The cell C is removably mounted in a socket 4, terminating in a mercury-cup 5, into which the outer end of the cathode 3 projects for making connection with the cathode. A bushing 6, of soft-rubber tubing, is inserted in the socket 4 to make a tight fit with the glass cell, so as to hold it firmly in place and prevent spilling of the mercury. The socket 4 is mounted upon a base 7, both the socket and base being preferably of a material not affected by the electrolyte. The minute anode 2 is supported by a silver jacket 8, which is attached to a copper wire 9, held by a screw-clip 10 on the end of a horizontal arm 11. This arm is mounted upon a standard 12 on the base 7 by a long sleeve 13. Springs 14, attached to the arm 11, bear against the flat face of the standard 12, so as to take up lost motion. The arm 11 is guided in its movement on the standard 12 by a pin 15, working in slots 16, the upper ends of these vertical slots 16 being extended into lateral slots 17, so as to permit the arm 11 to be swung to one side when moved to its uppermost position and after the anode is clear of the cell. The standard 12 is hollow, and within it is placed a spiral spring 18, pressing downwardly on the cross-pin 15 and surrounding a screw 19, which extends upwardly from the cross-pin through a cap 20 on the top of the standard 12. The cap 20 confines the spring 18, which spring exerts a downward pressure on the cross-pin 15, tending to keep the arm 11 in its lowermost position. The arm 11 is lifted by means of a nut 21 turning upon the screw 19 and bearing upon the cap 20. The top of the nut 21 may be graduated to show the degree of adjustment. Binding-posts 22 are connected with the mercury-cup 5 and through it with the cathode of the cell, while binding-posts 23 are connected with the standard 12 and through it with the anode of the cell.

Referring to Fig. 4, which shows the connections of the apparatus for use as a receiver in wireless telegraphy, 24 is the local battery, having its positive pole connected to the anode of the cell and its negative pole connected to the cathode. 25 is an adjustable resistance-coil or potentiometer connected in shunt to the battery and cell, whose function is to regulate the voltage across the terminals of the cell. This coil is wound inductively to prevent the escape of the oscillations through itself or through the battery, a sufficient length of the coil for this purpose being always maintained in circuit between the battery and the cell. 26 is a telephone-receiver which is connected in the battery-circuit between the potentiometer and the cell. 27 is the antenna or aerial wire, and 28 is the ground-wire, which are connected, respectively, with the anode and cathode of the cell, but may have reverse connections with the cell.

The operation of the apparatus is evident from the description already given.

The apparatus described is not claimed herein, but will be made the subject of a divisional application.

What I claim is—

1. The method of detecting electromagnetic waves or other feeble electrical impulses, which consists in polarizing an electrolytic cell of minute electrolytic capacity, effecting by such waves or impulses a partial or complete depolarization of such cell, and observing increases in current caused by the depolarization of the cell by said waves or impulses.

2. The method of detecting electromagnetic waves or other feeble electrical impulses, which consists in polarizing an electrolytic cell having a minute anode, effecting by such waves or impulses a partial or complete depolarization of such cell, and observing increases in current caused by the depolarization of the cell by said waves or impulses.

3. The method of detecting electromagnetic waves or other feeble electrical impulses, which consists in polarizing an electrolytic cell having a minute anode at which gas is evolved, effecting by such waves or impulses a partial or complete depolarization of such cell, and observing increases in current caused by the depolarization of the cell by said waves or impulses.

4. The method of detecting electromagnetic waves or other feeble electrical impulses, which consists in polarizing an electrolytic cell having a minute anode at which oxygen is evolved, effecting by such waves or impulses a partial or complete depolarization of such cell, and observing increases in current caused by the depolarization of the cell by said waves or impulses.

5. The method of detecting electromagnetic waves or other feeble electrical impulses, which consists in polarizing, by a local source of electromotive force, an electrolytic cell, passing the waves or impulses to be detected through said cell in such manner as to wholly or partially depolarize the cell and thereby increase the current in the local circuit, and observing the variations in flow of the local current.

6. The method of detecting electromagnetic waves or other feeble electrical impulses, which consists in polarizing, by a local source of electromotive force, an electrolytic cell having a minute anode, passing the waves or impulses to be detected through said cell in such manner as to wholly or partially depolarize the cell and thereby increase the current in the local circuit, and observing the variations in flow of the local current.

7. The method of detecting electromagnetic waves or other feeble signal impulses, which consists in polarizing by a local source of electromotive force an electrolytic cell, passing the waves or impulses to be detected through said cell in parallel with the polarizing-current, and observing the variations in flow of the local current.

8. The method of detecting electromagnetic waves or other feeble signal impulses, which consists in polarizing by a local source of electromotive force an electrolytic cell having a minute anode, passing the waves or impulses to be detected through said cell in parallel with the polarizing-current, and observing the variations in flow of the local current.

9. The method of detecting electromagnetic waves or other feeble electrical impulses, which consists in polarizing an electrolytic cell by an impressed voltage higher than the decomposition voltage of the cell but lower than the voltage at which a violent evolution of gas is caused, effecting by such waves or impulses a partial or complete depolarization of such cell, and observing changes in the polarization of the cell caused by said waves or impulses.

10. The method of detecting electromagnetic waves or other feeble electrical impulses, which consists in polarizing an electrolytic cell having a minute anode by an impressed voltage higher than the decomposition voltage of the cell but lower than the voltage at which a violent evolution of gas is caused, effecting by such waves or impulses a partial or complete depolarization of such cell, and observing changes in the polarization of the cell caused by said waves or impulses.

11. The method of detecting electromagnetic waves or other feeble electrical impulses, which consists in polarizing an electrolytic cell by means of a local source of electromotive force producing at the cell a voltage above the decomposition voltage of the cell but below the point where a violent evolution of gas is caused, passing the waves or impulses to be detected through said cell and thereby wholly or partially depolarizing the same whereby the current in the local circuit will be increased, and observing the variations in flow of the local current.

12. The method of detecting electromagnetic waves or other feeble electrical impulses, which consists in polarizing an electrolytic cell having a minute anode by means of a local source of electromotive force producing at the cell a voltage above the decomposition voltage of the cell but below the point where a violent evolution of gas is caused, passing the waves or impulses to be detected through said cell and thereby wholly or partially depolarizing the same whereby the current in the local circuit will be increased, and observing the variations in flow of the local current.

This specification signed and witnessed this 28th day of July, 1904.

FREDERICK K. VREELAND.

Witnesses:
  JNO. ROBT. TAYLOR,
  JOHN L. LOTSCH.

It is hereby certified that in Letters Patent No. 780,842, granted January 24, 1905, upon the application of Frederick K. Vreeland, of Montclair, New Jersey, for an improvement in "Methods of Receiving Electromagnetic Waves or other Feeble Signal Impulses," errors appear in the printed specification requiring correction, as follows: In line 25, page 2, the word "disposition" should read *deposition;* and in line 54, same page, the comma after the word "liquids" should be stricken out; and that the said Letters Patent should be read with these corrections therein that the same may conform to the record of the case in the Patent Office.

Signed and sealed this 7th day of March, A. D., 1905.

[SEAL.]

F. I. ALLEN,
*Commissioner of Patents.*